United States Patent
Kamran et al.

(10) Patent No.: US 10,826,990 B2
(45) Date of Patent: Nov. 3, 2020

(54) CLUSTERED STORAGE SYSTEM CONFIGURED FOR BANDWIDTH EFFICIENT PROCESSING OF WRITES AT SIZES BELOW A NATIVE PAGE SIZE

(71) Applicant: EMC IP Holding Company LLC, Hopkinton, MA (US)

(72) Inventors: Lior Kamran, Rishon LeZion (IL); Amitai Alkalay, Kadima (IL); Zvi Schneider, Tel Aviv (IL); Vladimir Shveidel, Pardes-Hana (IL); Oran Baruch, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

(21) Appl. No.: 16/042,544

(22) Filed: Jul. 23, 2018

(65) Prior Publication Data
US 2020/0028907 A1 Jan. 23, 2020

(51) Int. Cl.
*H04L 29/08* (2006.01)
*G06F 3/06* (2006.01)
(Continued)

(52) U.S. Cl.
CPC .......... *H04L 67/1097* (2013.01); *G06F 3/061* (2013.01); *G06F 3/064* (2013.01);
(Continued)

(58) Field of Classification Search
CPC . H04L 67/1097; G06F 16/2255; G06F 3/061; G06F 3/067; G06F 12/0223;
(Continued)

(56) References Cited

U.S. PATENT DOCUMENTS 7,165,155 B1 1/2007 Duprey et al.
7,440,982 B2 10/2008 Lu et al.
(Continued)

FOREIGN PATENT DOCUMENTS

WO 2016111954 A1 7/2016
WO PCT/US2019/024885 1/2020
WO PCT/US2019/024900 1/2020

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — John A Follansbee
*Assistant Examiner* — Lam T Do
(74) *Attorney, Agent, or Firm* — Ryan, Mason & Lewis, LLP

(57) ABSTRACT

A control module of a clustered storage system in one embodiment is configured to receive a write request for a data block of a page, to retrieve an existing content-based signature for the page, to identify from the existing content-based signature a first one of the data modules currently storing the page, and to compute a content-based signature of the data block. The control module is further configured to send the content-based signature of the data block to the first data module, to receive from the first data module an updated content-based signature for the page computed utilizing the content-based signature of the data block, to identify from the updated content-based signature a second one of the data modules that will store the page as updated to include the data block, and to provide information regarding the data block and the updated content-based signature to the second data module for utilization in storage of the updated page.

20 Claims, 5 Drawing Sheets

(51) Int. Cl.
  *G06F 12/02* (2006.01)
  *G06F 16/22* (2019.01)
(52) U.S. Cl.
  CPC .......... *G06F 3/067* (2013.01); *G06F 12/0223* (2013.01); *G06F 16/2255* (2019.01); *G06F 2212/1041* (2013.01); *G06F 2212/154* (2013.01)
(58) Field of Classification Search
  CPC .............. G06F 3/064; G06F 2212/154; G06F 2212/1041; G06F 3/0641; G06F 3/0659; G06F 3/0613; G06F 16/182
  See application file for complete search history.

(56) References Cited

U.S. PATENT DOCUMENTS

| | | | |
|---|---|---|---|
| 7,444,464 | B2 | 10/2008 | Urmston et al. |
| 7,747,584 | B1* | 6/2010 | Jernigan, IV ....... G06F 16/1748 707/692 |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1* | 12/2015 | Hallak ................. G06F 16/9014 |
| 9,286,003 | B1 | 3/2016 | Hallak et al. |
| 9,396,243 | B1* | 7/2016 | Halevi ..................... G06F 16/27 |
| 9,442,941 | B1* | 9/2016 | Luz .......................... G06F 3/064 |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,152,371 | B1 | 12/2018 | Braunschvig et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1* | 5/2012 | Frank ...................... G06F 3/061 711/108 |
| 2012/0246383 | A1* | 9/2012 | Asano .................. G06F 11/1068 711/102 |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185316 | A1* | 6/2017 | Nieuwejaar ............. G06F 3/065 |
| 2017/0185529 | A1 | 6/2017 | Chhabra et al. |
| 2017/0192857 | A1 | 7/2017 | Meiri et al. |
| 2017/0322960 | A1* | 11/2017 | Glebe ................. G06F 16/2228 |
| 2018/0095873 | A1 | 4/2018 | Nakagoe et al. |
| 2018/0136840 | A1* | 5/2018 | Ouyang ............... G06F 3/0659 |
| 2019/0303490 | A1 | 10/2019 | Chen et al. |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Y. Zhang et al., "End-to-End Integrity for File Systems: A ZFS Case Study," Proceedings of the 8th USENIX Conference on File and Storage Technologies (FAST), Feb. 23-26, 2010, 14 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
U.S. Appl. No. 15/281,593 filed in the name of Gilad Braunschvig et al. and entitled "End-to-End Data Protection for Distributed Storage."
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
U.S. Appl. No. 15/662,708 filed in the name of Xiangping Chen et al. filed Jul. 28, 2017, and entitled "Token-Based Data Flow Control in a Clustered Storage System."
U.S. Appl. No. 15/793,121 filed in the name of David Meiri et al. filed Oct. 25, 2017, and entitled "Opportunistic Compression of Replicated Data in a Content Addressable Storage System."
U.S. Appl. No. 15/824,536 filed in the name of Christopher Sayles et al. filed Nov. 28, 2017, and entitled "Storage System with Asynchronous Messaging between Processing Modules for Data Replication."
U.S. Appl. No. 16/253,793 filed in the name of Yuval Harduf et al. filed Jan. 22, 2019, and entitled "Storage System with Data Consistency Checking in Synchronous Replication Using Active Snapshot Set."
U.S. Appl. No. 16/265,131 filed in the name of Lior Kamran et al. filed Feb. 1, 2019, and entitled "Storage System with Write Cache Release Protection."
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

(56) References Cited

OTHER PUBLICATIONS

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/396,897 filed in the name of Anton Kucherov et al. filed Apr. 29, 2019, and entitled "Storage System with Deduplication-Aware Replication Implemented Using a Standard Storage Command Protocol."
U.S. Appl. No. 16/413,050 filed in the name of Xiangping Chen et al. filed May 15, 2019, and entitled "Storage System with Coordinated Recovery across Multiple Input-Output Journals of Different Types."
U.S. Appl. No. 16/530,121 filed in the name of Anton Kucherov et al. filed Aug. 2, 2019, and entitled "Memory-Efficient Processing of Raid Metadata Bitmaps."
U.S. Appl. No. 16/663,524 filed in the name of Xiangping Chen et al. filed Oct. 25 2019, and entitled "Storage System with Throughput-Based Timing of Synchronous Replication Recovery."
U.S. Appl. No. 16/665,651 filed in the name of Lior Kamran et al. filed Oct. 28 2019, and entitled "Recovery Flow with Reduced Address Lock Contention in a Content Addressable Storage System."
U.S. Appl. No. 16/671,824 filed in the name of Lior Kamran et al. filed Nov. 1, 2019, and entitled "Storage System Capacity Expansion Using Mixed-Capacity Storage Devices."
U.S. Appl. No. 16/693,858 filed in the name of Doron Tal filed Nov. 25, 2019, and entitled "Storage System with Prioritized RAID Rebuild."

\* cited by examiner

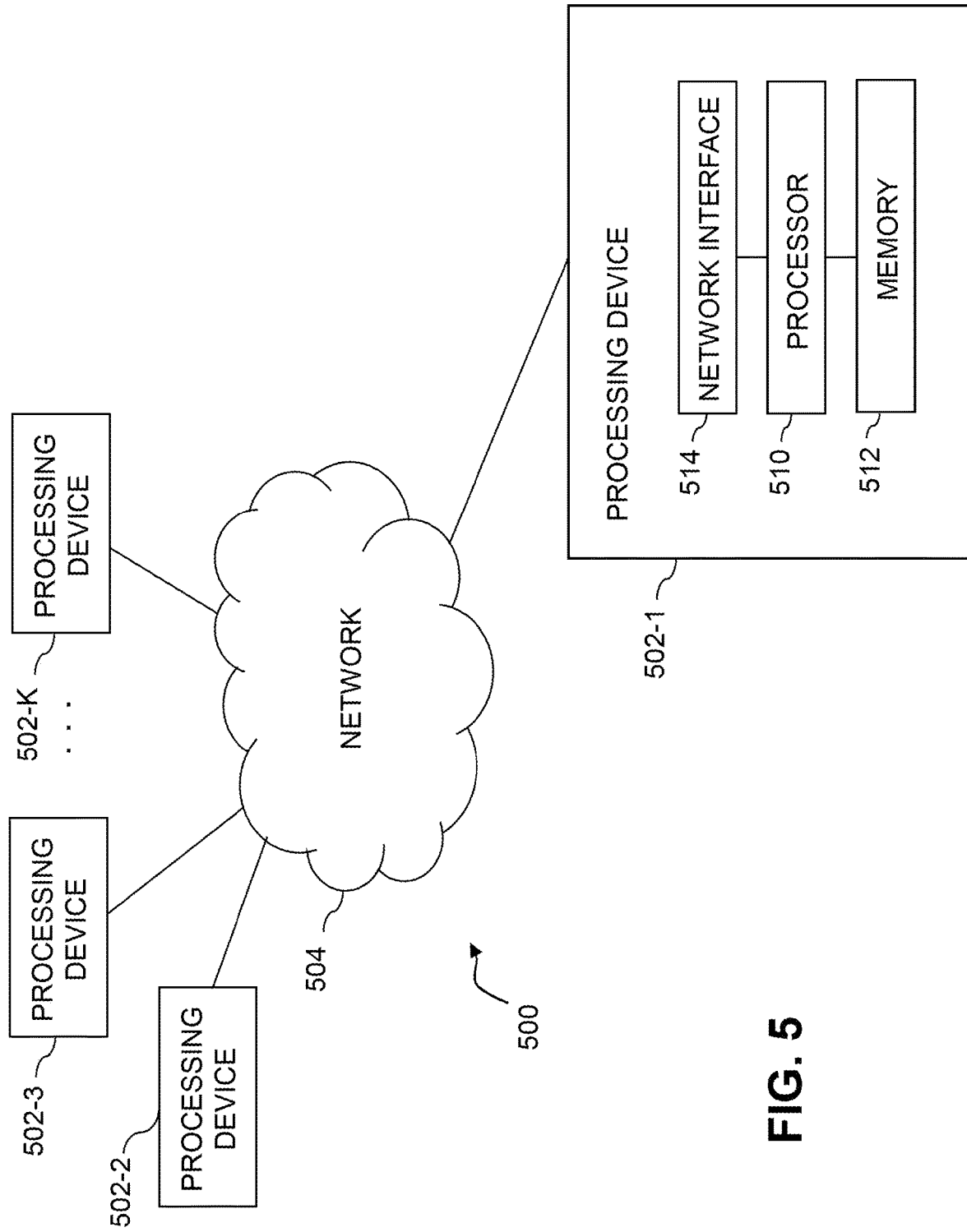

CLUSTERED STORAGE SYSTEM
CONFIGURED FOR BANDWIDTH
EFFICIENT PROCESSING OF WRITES AT
SIZES BELOW A NATIVE PAGE SIZE

FIELD

The field relates generally to information processing systems, and more particularly to storage in information processing systems.

BACKGROUND

Various types of content addressable storage systems are known. Some content addressable storage systems allow data pages of one or more logical storage volumes to be accessed using content-based signatures that are computed from content of respective ones of the data pages. Such content addressable storage system arrangements facilitate implementation of deduplication and compression. For example, the storage system need only maintain a single copy of a given data page even though that same data page may be part of multiple logical storage volumes. Although these and other content addressable storage systems typically provide a high level of storage efficiency through deduplication and compression, system performance may be significantly degraded when processing write requests for data blocks that are smaller than a native page size of the system. For example, processing of such write requests can consume unduly large amounts of network bandwidth for inter-module communications in a clustered implementation of a content addressable storage system.

SUMMARY

Illustrative embodiments provide content addressable storage systems that are configured for bandwidth efficient processing of write requests for data blocks smaller than a native page size of the system. Such write requests are also referred to herein as "small writes." Some embodiments significantly reduce the amount of network bandwidth consumed by inter-module communications in processing of small writes. The performance of the content addressable storage system is therefore not degraded in any significant way even when the system is processing potentially large numbers of small writes.

These embodiments illustratively include a clustered implementation of a content addressable storage system having a distributed storage controller. Similar advantages can be provided in other types of storage systems.

In one embodiment, a storage system comprises multiple storage nodes each comprising at least one storage device. Each of the storage nodes further comprises a set of processing modules configured to communicate over one or more networks with corresponding sets of processing modules on other ones of the storage nodes. The sets of processing modules of the storage nodes each comprise at least one control module and at least one data module, with different portions of a logical address space of the storage system being assigned to different ones of the control modules. Each of the control modules is configured to process received write requests in cooperation with particular ones of the data modules for storage of corresponding pages in particular ones of the storage devices.

A given one of the above-noted control modules in some embodiments is illustratively configured to receive a write request for a data block of a page, to retrieve an existing content-based signature for the page, to identify from the existing content-based signature a first one of the data modules currently storing the page, to compute a content-based signature of the data block, to send the content-based signature of the data block to the first data module, to receive from the first data module an updated content-based signature for the page computed utilizing the content-based signature of the data block, to identify from the updated content-based signature a second one of the data modules that will store the page as updated to include the data block, and to provide information regarding the data block and the updated content-based signature to the second data module for utilization in storage of the updated page.

The sets of processing modules collectively comprise at least a portion of a distributed storage controller of the storage system. The assignment of portions of the logical address space of the storage system to respective ones of the control modules is implemented in some embodiments at least in part by at least one system-wide management module of the distributed storage controller. The portions of the logical address space illustratively comprise respective equal-size portions each comprising a designated number of pages in a native page size of the storage system. Multiple distinct portions of the logical address space may be assigned to at least one of the control modules.

The data block illustratively represents a particular portion of a page. For example, the data block may have a size that is a fraction 1/n of a native page size of the storage system, where n is 2, 4, 8 or 16 and the native page size is one of 4 KB, 8 KB or 16 KB. Numerous alternative relationships between data block size and page size are possible.

The existing and updated content-based signatures of the page in some embodiments are each generated as a function of multiple content-based signatures of respective data blocks of the page with each such content-based signature being generated using a designated hash function. In some embodiments, retrieving an existing content-based signature for the page comprises accessing an address-to-hash table of the control module to identify the existing content-based signature from a logical address specified in the write request.

Additionally, identifying from the existing content-based signature a first one of the data modules currently storing the page comprises accessing a hash-to-data table of the control module to identify the first data module from the existing content-based signature.

In some embodiments, receiving from the first data module an updated content-based signature for the page computed utilizing the content-based signature of the data block comprises receiving an updated content-based signature for the page that is computed as a function of the content-based signature of the data block and content-based signatures of respective other data blocks of the page.

The updated content-based signature is illustratively received from the first data module with a pointer to a location of the page as stored by the first data module.

In some embodiments, identifying from the updated content-based signature a second one of the data modules that will store the page as updated to include the data block comprises accessing a hash-to-data table of the control module to identify the second data module from the updated content-based signature.

Providing information regarding the data block and the updated content-based signature to the second data module for utilization in storage of the updated page illustratively comprises sending the pointer, the data block, and the updated content-based signature to the second data module. The second data module utilizes the pointer to retrieve additional data blocks of the page from the first data module and stores the updated page including the received data block and the retrieved additional data blocks in one of the storage devices.

Instead of sending the data block itself to the second data module, the control module in some embodiments may send an additional pointer that allows the second data module to retrieve the data block.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 4 and 5 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
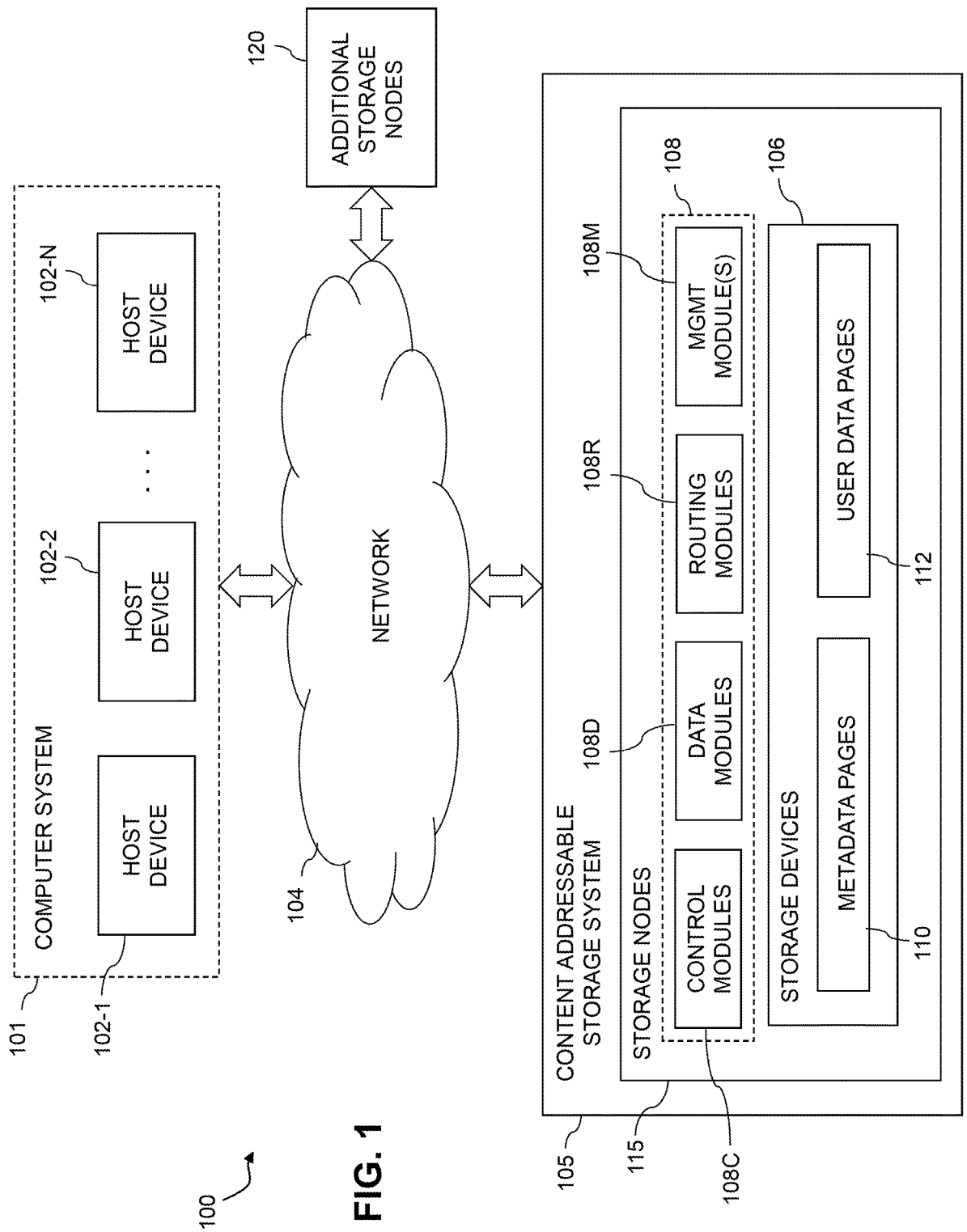
FIG. 1 is a block diagram of an information processing system comprising a content addressable storage system configured for bandwidth efficient processing of small writes in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate bandwidth efficient processing of small writes as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

The distributed storage controller 108 of the content addressable storage system 105 in the present embodiment is configured to control the implementation of functionality for bandwidth efficient processing of small writes as disclosed herein. The distributed storage controller 108 is assumed to comprise a type of "processing device" as that term is broadly used herein, and more particularly comprises at least one processor coupled to a memory.

It is assumed in some embodiments that the processing modules of the distributed controller 108 are interconnected in a full mesh network, such that a process of one of the processing modules can communicate with processes of any of the other processing modules. Commands issued by the processes can include, for example, remote procedure calls (RPCs) directed to other ones of the processes.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein. Also, illustrative embodiments can utilize a particular selected page size or other designated page size in place of a native page size. In some embodiments, the designated page size could be a fixed page size utilized by the storage system in a particular operating mode.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the SHA1 hash function, where SHA denotes Secure Hashing Algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for bandwidth efficient processing of small writes in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include control logic that engages or otherwise interacts with corresponding control logic instances in at least a subset of the control modules 108C, data modules 108D and routing modules 108R in order to implement bandwidth efficient processing of small writes.

In some embodiments, the content addressable storage system 105 comprises an XtremIO™ storage array suitably modified to incorporate techniques for bandwidth efficient processing of small writes as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for bandwidth efficient processing of small writes in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105. The HMD table in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for bandwidth efficient processing of small writes in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

The manner in which bandwidth efficient processing of small writes is implemented using processing modules of the distributed storage controller 108 in illustrative embodiments will now be described in detail.

It is assumed in the context of the following description that the bandwidth efficient processing in illustrative embodiments involves each of a plurality of control modules processing sets of received writes that are directed by one or more of the host devices 102 to the content addressable storage system 105. The bandwidth efficient processing is described below for a given one of the control modules 108C interacting with first and second ones of the data modules 108D, and other ones of the control modules 108C are assumed to interact in a similar manner with the data modules 108D. In some situations, references herein to "first" and "second" data modules may refer to the same data module, although typically such references are to different ones of the data modules 108D.

Different portions of a logical address space of the content addressable storage system 105 are assigned to different ones of the control modules 108C, illustratively by the management module 108M. Each of the control modules 108C is configured to process received write requests in cooperation with particular ones of the data modules 108D for storage of corresponding pages in particular ones of the storage devices 106.

The portions of the logical address space illustratively comprise respective equal-size portions each comprising a designated number of pages in a native page size of the storage system. Multiple distinct portions of the logical address space may be assigned to at least one of the control modules 108C.

A "small write" in some embodiments is assumed to comprise a write to at least one but less than all of a plurality of data blocks of a given multi-block page. For example, the small write in some embodiments to be described comprises a write to a single data block of a multi-block page. The single data block of the page being written by the small write is referred to as a new data block, while the remaining data blocks of the page that are not being written by the small write are referred to as other data blocks. Other types of small writes may be processed in other embodiments.

The given one of the control modules 108C is illustratively configured to receive a write request for a data block of a page, to retrieve an existing content-based signature for the page, to identify from the existing content-based signature a first one of the data modules currently storing the page, to compute a content-based signature of the data block, to send the content-based signature of the data block to the first data module, to receive from the first data module an updated content-based signature for the page computed utilizing the content-based signature of the data block, to identify from the updated content-based signature a second one of the data modules that will store the page as updated to include the data block, and to provide information regarding the data block and the updated content-based signature to the second data module for utilization in storage of the updated page.

The data block being written by the small write in some embodiments has a size that is a fraction 1/n of a native page size of the storage system, where n is 2, 4, 8 or 16 and the native page size is one of 4 KB, 8 KB or 16 KB. For example, in one implementation to be described below, the page size is 8 KB and the data block size is 2 KB, such that n=4. The usage of variable n in this context is different from its usage in certain other contexts herein. These particular data block sizes and page sizes are only examples, and a wide variety of different relationships between data block size and page size can be used in other embodiments. Also, as indicated previously, a small write can comprise a write directed to multiple data blocks of a given page, but to fewer than all of the data blocks of that page. For example, a small write in other embodiments can comprise a request to write two or three of the 2 KB data blocks of the above-noted 8 KB page, and thus fewer than all four of the 2 KB data blocks of the 8 KB page. Again, numerous alternative arrangements are possible.

The existing and updated content-based signatures of the page containing the data block subject to the small write are each generated as a function of multiple content-based signatures of respective data blocks of the page, with each such content-based signature being generated using a designated hash function such as SHA1. As mentioned previously, alternative hash functions that may be used include SHA2, SHA256, and many others. The resulting content-based signatures can comprise hash digests or hash handles of the corresponding page.

In retrieving an existing content-based signature for the page, the given control module illustratively accesses an A2H table of that control module to identify the existing content-based signature from a logical address specified in the write request.

In identifying from the existing content-based signature a first one of the data modules currently storing the page, the given control module illustratively accesses an H2D table of that control module to identify the first data module from the existing content-based signature. The H2D table is configured to associate each page of a logical address space with a particular one of the data modules 108C.

Other types of mapping tables and techniques for retrieving existing content-based signatures and identifying data modules from those content-based signatures can be used in other embodiments.

In some embodiments, receiving from the first data module an updated content-based signature for the page computed utilizing the content-based signature of the data block comprises receiving an updated content-based signature for the page that is computed as a function of the content-based signature of the data block and content-based signatures of respective other data blocks of the page. These other data blocks of the page are assumed to comprise those data blocks that are not being written by the small write. The updated content-based signature is illustratively received from the first data module with a pointer to a location of the page as stored by the first data module.

The computation of the updated content-based signature for the page as a function of the content-based signature of the data block and content-based signatures of respective other data blocks of the page in some embodiments may utilize split-hash computation techniques of the type disclosed in U.S. patent application Ser. No. 15/281,593, now U.S. Pat. No. 10,152,371, entitled "End-To-End Data Protection for Distributed Storage," which is incorporated by reference herein. Other types of techniques involving content-based signatures computed for respective data blocks of a given page can be used.

In identifying from the updated content-based signature a second one of the data modules that will store the page as updated to include the data block, the given control module illustratively accesses the H2D table of that control module to identify the second data module from the updated content-based signature.

In some embodiments, providing information regarding the data block and the updated content-based signature to the second data module for utilization in storage of the updated page comprises sending the pointer, the data block, and the updated content-based signature to the second data module.

The second data module utilizes the pointer to retrieve additional data blocks of the page from the first data module and stores the updated page including the received data block and the retrieved additional data blocks in one of the storage devices.

Instead of sending the data block itself to the second data module, the control module in some embodiments may send an additional pointer that allows the second data module to retrieve the data block.

Although the above embodiments are described with reference to a small write that writes a data block to a multi-block page, the disclosed techniques are similarly applicable to writing of two or more but less than all data blocks of a given page.

A more particular example of bandwidth efficient processing of small writes in an illustrative embodiment will now be described. In this example, a given multi-block page prior to execution of the small write is denoted OldPage and the page after execution of the small write is denoted NewPage, with OldPage and NewPage potentially being stored by different ones of the data modules 108C in different ones of the storage devices 106.

The given control module receiving the small write needs the content-based signature of NewPage in order to identify from its H2D which of the data modules 108D should store that updated page. However, since the small write is only updating a portion of the page, illustratively one or more but less than all of the data blocks of that page, the given control module cannot by itself compute the updated content-based signature for NewPage. Instead, the given control module in the present example interacts with the data module that currently stores OldPage in computing the updated content-based signature for NewPage.

It is assumed for this example that the control modules 108C and the data modules 108D are interconnected in a full mesh network, such that each of the control modules can communicate with each of the data modules. The control modules 108C are assumed to be responsible for maintaining mapping information including the A2H and H2D tables, while the data modules 108D are assumed to be responsible for the physical storage of fixed-size pages in the storage devices 106. A given write request to a particular logical address is handled by the control module which determines from the A2H and D2H tables the appropriate one of the data modules 108D for storing the page.

In this example, it is further assumed that NewPage is constructed by combining OldPage and a single new data block specified in the small write. Accordingly, two different data modules are typically involved, namely, a "first" or "old" data module that currently stores OldPage and a "second" or "new" data module that will store NewPage. The first data module is identified by the control module using the A2H and H2D tables. The second data module is identified by the control module using the H2D table after interacting with the first data module to compute the updated content-based signature for NewPage.

The page size in the present example is illustratively 8 KB and the new data block size is 2 KB, although as indicated previously numerous other arrangements can be used. A split-hash technique of the type described in the above-cited U.S. patent application Ser. No. 15/281,593 is utilized. The page is split into four 2 KB data blocks denoted b1, b2, b3 and b4 and hashes are calculated for the respective data blocks as H1=F(b1), H2=F(b2), H3=F(b3) and H4=F(b4), where F(•) denotes a hash function. These hashes are respective content-based signatures of the individual 2 KB blocks. A hash H of the page is computed as H=F(H1·H2·H3·H4), where the hash H is the content-based signature of the page utilized in the A2H and H2D tables of the given control module.

A small write altering any one of the data blocks b1, b2, b3 or b4, or combinations thereof representing fewer than all of the data blocks of the page, can be processed in a bandwidth efficient manner using the techniques disclosed herein. Assume for purposes of the present example that a small write updates only data block b 1.

The bandwidth efficient processing in this example then more particularly includes the following operations:

1. The control module receives a small write directed to OldPage. The small write includes a new data block b1' to replace the data block b1.

2. The control module retrieves from its A2H table the hash H of OldPage.

3. The control module uses H to identify from the H2D table the data module that currently stores OldPage. This data module is illustratively referred to as the "first" data module.

4. The control module calculates H1'=F(b1') and sends a command to the first data module that includes H1'. The actual new data block b1' is not transmitted at this stage.

5. The first data module calculates the hash of NewPage as H'=F(H1'·H2·H3·H4) and replies to the control module with the hash H' together with a pointer indicating the location of OldPage as stored by the first data module and accessible to the control module and the other data modules over the full mesh network.

6. The control module uses H' to identify from the H2D table the new data module that will store the updated page. This data module is illustratively referred to as the "second" data module.

7. The control module sends a command to the second data module that includes a pointer to the new data block b1' as stored by the control module, the new hash H', and the pointer to OldPage as stored by the first data module.

Alternatively, the control module can directly send the new data block b1' itself to the second data module, along with the new hash H' and the pointer to OldPage, instead of sending a pointer to the new data block.

8. The second data module reads the unchanged data blocks b2, b3 and b4 from the first data module, reads the new data block b1' of the small write from the control module, constructs NewPage as comprising data blocks b1', b2, b3 and b4, and writes NewPage to the appropriate storage device.

This approach substantially reduces network bandwidth consumption relative to a possible alternative approach in which the new data block b1' is transmitted over the network twice, once from the control module to the first data module for use in computing the updated hash H' of NewPage and then a second time from the control module to the second data module in order to allow NewPage to be written to the appropriate storage device.

These particular operations are only an example, and additional or alternative operations can be used in other embodiments. Similar reductions in network bandwidth consumption are achieved in such other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for bandwidth efficient processing of small writes as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
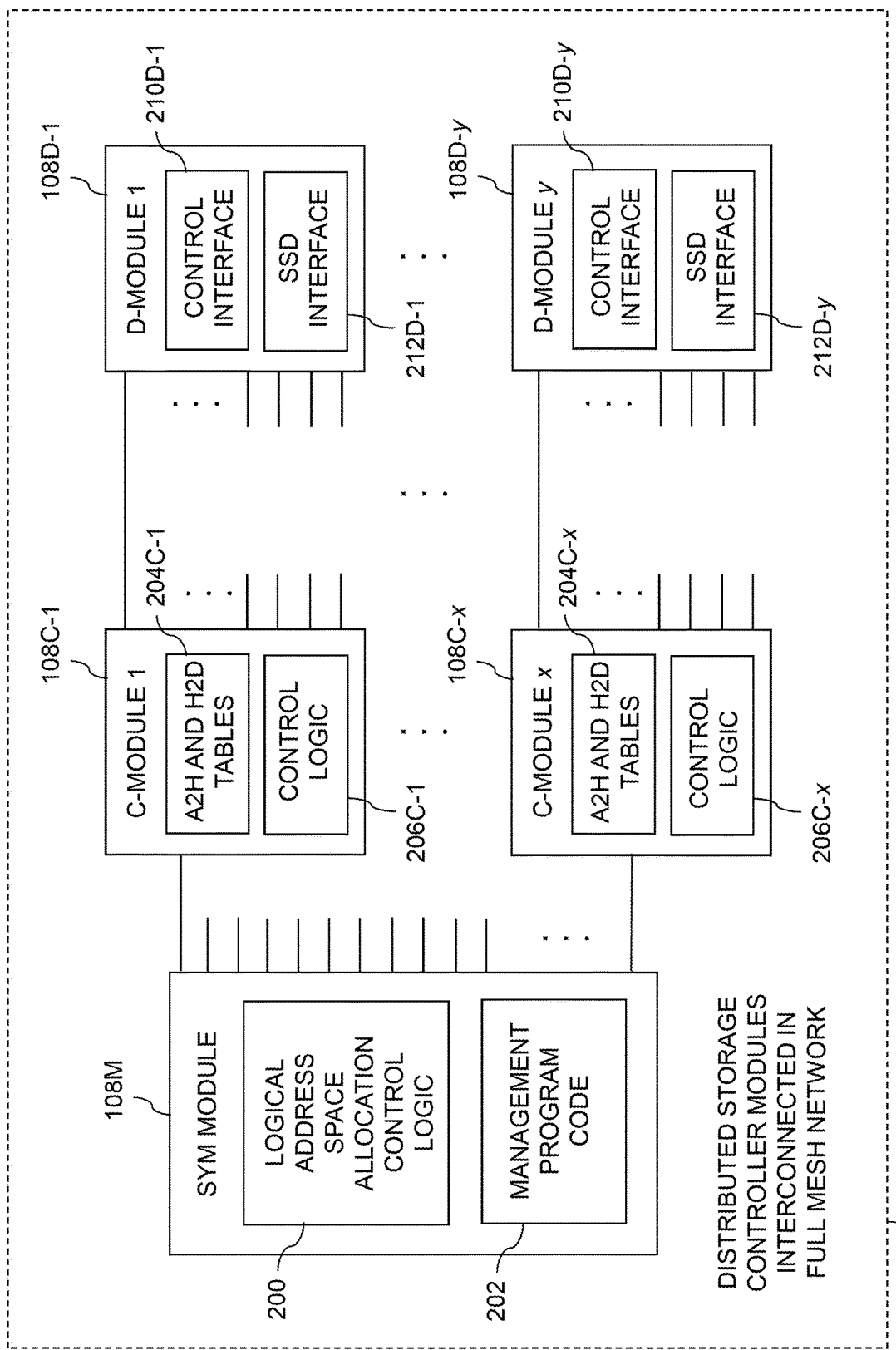
FIG. 2 illustrates a portion of a distributed storage controller of a content addressable storage system showing one possible arrangement utilizing control modules and data modules configured for bandwidth efficient processing of small writes in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises logical address space allocation control logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of A2H and H2D tables 204C-1 through 204C-x. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. The control modules 108C-1 through 108C-x further comprise corresponding instances of small write processing control logic 206C-1 through 206C-x that interact with the control logic 200 of the management module 108M to support bandwidth efficient processing of small writes as disclosed herein.

The control modules 108C may further comprise additional components not explicitly shown in FIG. 2, such as respective messaging interfaces that are utilized by the control modules 108 to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 3:
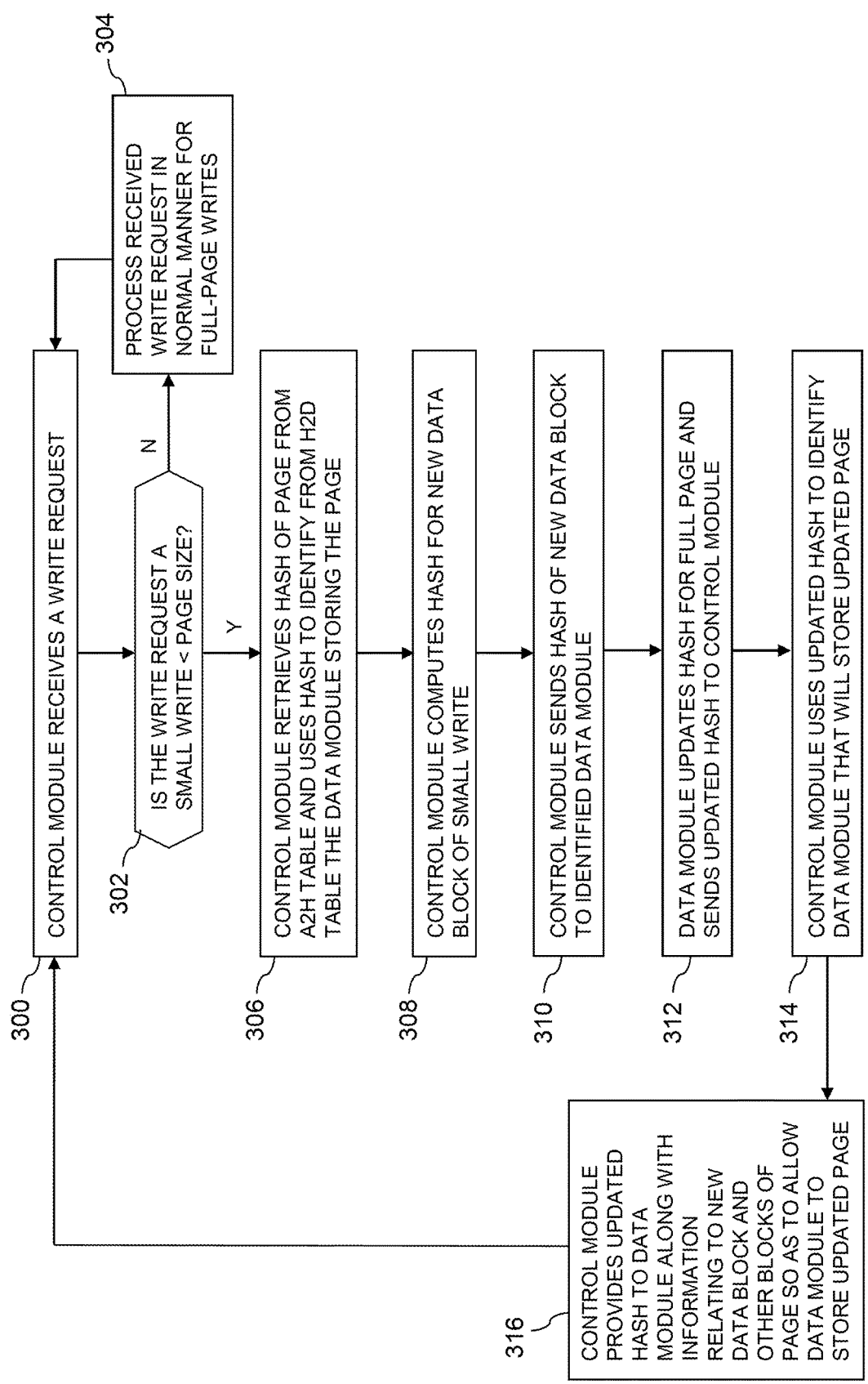
FIG. 3 is a flow diagram of a process for bandwidth efficient processing of small writes in a content addressable storage system in an illustrative embodiment.

The operation of the information processing system 100 will now be described in further detail with reference to the flow diagram of FIG. 3. The flow diagram of FIG. 3 illustrates a set of processing operations implementing functionality for bandwidth efficient processing of small writes in a content addressable storage system. The process includes steps 300 through 316, and is suitable for use in system 100 but is more generally applicable to other types of systems in which it is desirable to improve system performance by reducing the amount of network bandwidth consumed in processing of small writes below a native page size or other designated page size. The steps of the flow diagram are illustratively performed at least in part under the control of a storage controller of a storage system, such as the distributed storage controller 108 of content addressable storage system 105. For example, portions of the process in some embodiments are illustratively performed by a particular one of the control modules 108C interacting with first and second ones of the data modules 108D.

In step 300, a particular control module of a storage controller in a content addressable storage system receives a write request. The write request is illustratively initiated by one of a plurality of host devices that direct various types of IO operations to logical storage volumes of the content addressable storage system.

In step 302, a determination is made as to whether or not the write request received in step 300 is what is referred to herein as a "small write." Such a write request is illustratively directed to only a portion of a page, rather than to the full page, and therefore is referred to herein as having a size that is less than a page size. It is assumed for the FIG. 2 process that a small write is directed to at least one block of a multi-block page, but fewer than all of the blocks of a page. More particularly, in the following description it will be assumed that a given small write is directed to a single data block of a page that includes multiple data blocks. However, the disclosed techniques can be extended in a straightforward manner to accommodate small writes directed to more than one data block of a page, such as small writes directed to two data blocks in a page that includes three or more data blocks. These and numerous other data block and page arrangements can be associated with small writes in other embodiments, and the term "small write" as used herein is therefore intended to be broadly construed.

If the write request received in step 300 is not a small write but is instead a full-page write, which involves writing one or more full pages of a given logical storage volume, the process moves to step 304, and otherwise moves to step 306.

In step 304, the full-page write is processed in a normal manner for full-page writes. This is assumed to involve conventional write request handling functionality of the content addressable storage system. The FIG. 3 process then returns to step 300 as shown, to await the receipt of additional write requests.

In step 306, which is reached if the write request received in step 300 is a small write, illustratively to a particular data block of a page that includes multiple data blocks, the control module retrieves a hash of the page from its A2H table and utilizes the retrieved hash to identify from its H2D table a particular one of a plurality of data modules that currently stores the page that is subject to the small write. The "hash" in this context is a type of content-based signature, and illustratively comprises a hash digest generated by applying a hash function such as SHA1 to the content of the page. The hash may instead comprise a hash handle of the type described elsewhere herein.

In step 308, the control module computes a hash of the new data block that is to be written to the page. This is a type of content-based signature of the new data block. Like the hash of the corresponding page, it can be computed by applying a hash function such as SHA1 to the content of the new data block.

In step 310, the control module sends the hash of the new data block to the data module that currently stores the page, as previously identified using the retrieved hash of that page in step 306.

In step 312, the data module that currently stores the page utilizes the hash of the new data block received from the control module to compute an updated hash for the full page, and sends the updated hash for the full page back to the control module.

In step 314, the control module uses the updated hash received from the data module to identify the data module that will store the updated page with the new data block. These are illustratively two different data modules, also referred to herein as respective first and second data modules, with the first data module being the data module that currently stores the page prior to its update to include the new data block and the second data module being the data module that will store the page as updated to include the new data block. This is because writing the new data block to the page will typically change its content, such that the updated hash computed in step 312 will be different than the previous hash retrieved in step 306. However, it is possible in some situations for the first and second data modules to be the same data module, and the terms "first data module" and "second data module" as used herein are intended to be broadly construed so as to encompass this possibility.

In step 316, the control module provides the updated hash for the full page to the data module that will store the updated page, along with information relating to the new data block and the other data blocks of the page so as to allow the data module to store the updated page. For example, in some embodiments, the control module sends the new data block itself and the updated hash of the page to the data module, along with a pointer to the other data blocks that remain stored on the other data module. Alternatively, the control module can send an additional pointer to the new data block rather than the new data block itself to the data module, as well as the updated hash of the page and the pointer to the other data blocks of the page. The data module receiving this information from the control module retrieves the needed data blocks utilizing the one or more pointers and stores the updated page in a particular one of its associated storage devices utilizing the updated hash of the page. The process then returns to step 300 as shown to await additional write requests.

The particular processing operations and other system functionality described above in conjunction with the flow diagram of FIG. 3 are presented by way of illustrative example only, and should not be construed as limiting the scope of the disclosure in any way. Alternative embodiments can use other types of processing operations for bandwidth efficient processing of small writes in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to process different sets of write requests directed to different logical storage volumes of a given storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 3 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for bandwidth efficient processing of small writes as disclosed herein can provide a number of significant advantages relative to conventional arrangements.

For example, some embodiments provide content addressable storage systems and other types of clustered storage systems that are configured to significantly reduce the amount of network bandwidth consumed by inter-module communications in processing of small writes. Such arrangements can ensure that the performance of the content addressable storage system is therefore not degraded in any significant way even when the system is processing potentially large numbers of small writes.

In some embodiments, network bandwidth consumption is substantially reduced by avoiding the need for multiple transfers of one or more modified data blocks of a given page over a full mesh network interconnecting multiple control modules and multiple data modules of a distributed storage controller. Similar reductions in network bandwidth consumption are provided in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for bandwidth efficient processing of small writes will now be described in greater detail with reference to FIGS. 4 and 5. Although described in the context of system 100, these platforms may also be used to implement at least portions of other information processing systems in other embodiments.

Figure 4:
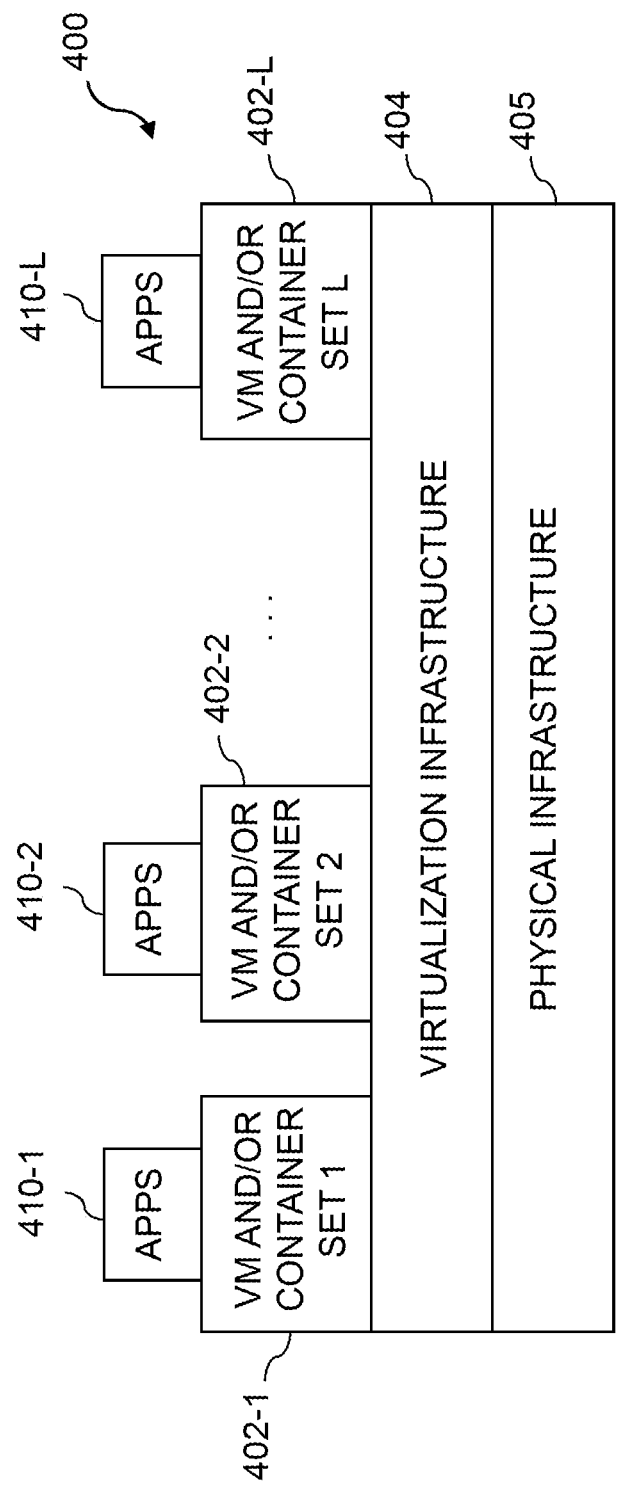

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide storage functionality of the type described above for one or more processes running on a given one of the VMs.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 3 process for bandwidth efficient processing of small writes.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, small write processing operations and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage nodes each comprising one or more storage devices;
each of the storage nodes further comprising:
a processor coupled to a memory; and
a set of processing modules each of which is implemented by the processor, the set of processing modules being configured to communicate over one or more networks with corresponding sets of processing modules on other ones of the storage nodes;
the sets of processing modules of the storage nodes each comprising at least one control module and at least one data module, with different portions of a logical address space of the storage system being assigned to different ones of the control modules, each of the control modules being configured to process received write requests in cooperation with particular ones of the data modules for storage of corresponding pages in particular ones of the storage devices;
wherein a given one of the control modules is configured:
to receive a write request for a data block of a page, the page having a size corresponding to a native page size of the storage system, wherein the data block is a part of the page, the page comprising the data block and one or more additional data blocks, the data block and the one or more additional data blocks each having a size that is less than the native page size of the storage system;
to retrieve an existing content-based signature for the page;
to identify from the existing content-based signature a first one of the data modules currently storing the page;
to compute a content-based signature of the data block;
to send the content-based signature of the data block to the first data module;
to receive from the first data module an updated content-based signature for the page computed utilizing the content-based signature of the data block;
to identify from the updated content-based signature a second one of the data modules that will store the page as updated to include the data block; and
to provide information regarding the data block and the updated content-based signature to the second data module for utilization in storage of the updated page.

2. The apparatus of claim 1 wherein the sets of processing modules collectively comprise at least a portion of a distributed storage controller of the storage system.

3. The apparatus of claim 2 wherein the assignment of portions of the logical address space of the storage system to respective ones of the control modules is implemented at least in part by at least one system-wide management module of the distributed storage controller.

4. The apparatus of claim 1 wherein the portions of the logical address space comprise respective equal-size portions each comprising a designated number of pages in the native page size of the storage system.

5. The apparatus of claim 1 wherein the data block has a size that is a fraction 1/n of the native page size of the storage system, where n is 2, 4, 8 or 16 and the native page size is one of 4 KB, 8 KB or 16 KB.

6. The apparatus of claim 1 wherein the existing and updated content-based signatures of the page are each generated as a function of multiple content-based signatures of respective data blocks of the page with each such content-based signature being generated using a designated hash function.

7. The apparatus of claim 1 wherein retrieving an existing content-based signature for the page comprises accessing an address-to-hash table of the control module to identify the existing content-based signature from a logical address specified in the write request.

8. The apparatus of claim 1 wherein identifying from the existing content-based signature a first one of the data modules currently storing the page comprises accessing a hash-to-data table of the control module to identify the first data module from the existing content-based signature.

9. The apparatus of claim 1 wherein receiving from the first data module an updated content-based signature for the page computed utilizing the content-based signature of the data block comprises receiving an updated content-based signature for the page that is computed as a function of the content-based signature of the data block and content-based signatures of respective other data blocks of the page.

10. The apparatus of claim 1 wherein the updated content-based signature is received from the first data module with a pointer to a location of the page as stored by the first data module.

11. The apparatus of claim 1 wherein identifying from the updated content-based signature a second one of the data modules that will store the page as updated to include the data block comprises accessing a hash-to-data table of the control module to identify the second data module from the updated content-based signature.

12. The apparatus of claim 10 wherein providing information regarding the data block and the updated content-based signature to the second data module for utilization in storage of the updated page comprises sending the pointer, the data block, and the updated content-based signature to the second data module.

13. The apparatus of claim 12 wherein the second data module utilizes the pointer to retrieve the one or more additional data blocks of the page from the first data module and stores the updated page including the received data block and the retrieved one or more additional data blocks in one of the storage devices.

14. The apparatus of claim 1 wherein multiple distinct portions of the logical address space of the storage system are assigned to at least one of the control modules.

15. A method comprising:
configuring a storage system to include a plurality of storage nodes each comprising at least one storage device, each of the storage nodes further comprising a set of processing modules configured to communicate over one or more networks with corresponding sets of processing modules on other ones of the storage nodes;
the sets of processing modules each comprising at least one control module and at least one data module, with different portions of a logical address space of the storage system being assigned to different ones of the control modules, each of the control modules being configured to process received write requests in cooperation with particular ones of the data modules for storage of corresponding pages in particular ones of the storage devices;
a given one of the control modules:
receiving a write request for a data block of a page, the page having a size corresponding to a native page size of the storage system, wherein the data block is a part of the page, the page comprising the data block and one or more additional data blocks, the data block and the one or more additional data blocks each having a size that is less than the native page size of the storage system;
retrieving an existing content-based signature for the page;
identifying from the existing content-based signature a first one of the data modules currently storing the page;
computing a content-based signature of the data block;
sending the content-based signature of the data block to the first data module;
receiving from the first data module an updated content-based signature for the page computed utilizing the content-based signature of the data block;
identifying from the updated content-based signature a second one of the data modules that will store the page as updated to include the data block; and
providing information regarding the data block and the updated content-based signature to the second data module for utilization in storage of the updated page;
wherein the method is performed by at least one processing device comprising a processor coupled to a memory.

16. The method of claim 15 wherein the existing and updated content-based signatures of the page are each generated as a function of multiple content-based signatures of respective data blocks of the page with each such content-based signature being generated using a designated hash function.

17. The method of claim 15 wherein receiving from the first data module an updated content-based signature for the page computed utilizing the content-based signature of the data block comprises receiving an updated content-based signature for the page that is computed as a function of the content-based signature of the data block and content-based signatures of respective other data blocks of the page.

18. A computer program product comprising a non-transitory processor-readable storage medium having stored therein program code of one or more software programs, wherein the program code when executed by at least one processing device causes said at least one processing device:
to configure a storage system to include a plurality of storage nodes each comprising at least one storage device, each of the storage nodes further comprising a set of processing modules configured to communicate over one or more networks with corresponding sets of processing modules on other ones of the storage nodes;
the sets of processing modules each comprising at least one control module and at least one data module, with different portions of a logical address space of the storage system being assigned to different ones of the control modules, each of the control modules being configured to process received write requests in cooperation with particular ones of the data modules for storage of corresponding pages in particular ones of the storage devices;
a given one of the control modules being configured:
to receive a write request for a data block of a page, the page having a size corresponding to a native page size of the storage system, wherein the data block is a part of the page, the page comprising the data block and one or more additional data blocks, the data block and the one or more additional data blocks each having a size that is less than the native page size of the storage system;
to retrieve an existing content-based signature for the page;
to identify from the existing content-based signature a first one of the data modules currently storing the page;
to compute a content-based signature of the data block;
to send the content-based signature of the data block to the first data module;
to receive from the first data module an updated content-based signature for the page computed utilizing the content-based signature of the data block;
to identify from the updated content-based signature a second one of the data modules that will store the page as updated to include the data block; and
to provide information regarding the data block and the updated content-based signature to the second data module for utilization in storage of the updated page.

19. The computer program product of claim 18 wherein the existing and updated content-based signatures of the page are each generated as a function of multiple content-based signatures of respective data blocks of the page with each such content-based signature being generated using a designated hash function.

20. The computer program product of claim 18 wherein receiving from the first data module an updated content-based signature for the page computed utilizing the content-based signature of the data block comprises receiving an updated content-based signature for the page that is computed as a function of the content-based signature of the data block and content-based signatures of respective other data blocks of the page.

* * * * *